(12) United States Patent
Kelly

(10) Patent No.: US 6,832,019 B2
(45) Date of Patent: Dec. 14, 2004

(54) DUPLEX REFLECTIVE RE-CONFIGURABLE OPTICAL ADD/DROP MULTIPLEXERS

(75) Inventor: Colin Geoffrey Kelly, Manotick (CA)

(73) Assignee: Tropic Networks Inc., Kanata (CA)

( * ) Notice: Subject to any disclaimer, the term of this patent is extended or adjusted under 35 U.S.C. 154(b) by 64 days.

(21) Appl. No.: 10/440,222

(22) Filed: May 19, 2003

(65) Prior Publication Data

US 2004/0008930 A1 Jan. 15, 2004

Related U.S. Application Data

(60) Provisional application No. 60/394,926, filed on Jul. 11, 2002.

(51) Int. Cl.[7] ................................................. G02B 6/28
(52) U.S. Cl. .............................. 385/24; 385/37; 398/83; 398/84
(58) Field of Search ................. 385/24, 37; 398/82–84, 398/87, 7, 14

(56) References Cited

U.S. PATENT DOCUMENTS 6,377,372 B1 * 4/2002 Yanagi ........................ 398/79
6,538,815 B1 * 3/2003 Cao ............................ 359/484

* cited by examiner

*Primary Examiner*—Leo Boutsikaris
(74) *Attorney, Agent, or Firm*—Victoria Donnelly

(57) ABSTRACT

Devices and methods are provided for a re-configurable optical add/drop multiplexer (ROADM) having a static circulator, a selectable grating and a reversible circulator. The use of a reversible circulator in a known optical drop multiplexer configuration allows the selectable grating to be used for selecting both the add-wavelength and the drop-wavelength while maintaining an East/West architectural split to allow for SONET compliant maintenance. This invention provides a cost-effective enhancement to a duplex reflective wavelength selective ROADM.

15 Claims, 4 Drawing Sheets

DUPLEX REFLECTIVE RE-CONFIGURABLE OPTICAL ADD/DROP MULTIPLEXERS

RELATED INVENTION

This application claims priority from U.S. Provisional Patent Application Ser. No. 60/394,926 filed on Jul. 11, 2002 (Kelly).

FIELD OF THE INVENTION

The invention relates to optical network communications. More particularly, the invention relates to re-configurable optical add/drop multiplexers.

BACKGROUND OF THE INVENTION

Recent advances in optical communications technology have provided an optical building block incorporating selectable optical gratings and a circulator. This building block is well suited to building efficient re-configurable optical add/drop multiplexers. FIG. 1 shows such a re-configurable optical add/drop multiplexer (ROADM) building block, generally indicated by 20. The building block provides optical drop capability and comprises an optical circulator 22 connected to a selectable fiber Bragg grating 24. In operation, a wavelength division multiplexed (WDM) optical signal is introduced at input port 26 of the optical circulator 22, which directs the optical signal to a first port 28 of the selectable fiber Bragg grating 24. The selectable fiber Bragg grating 24 is controlled at 30 to reflect a selected wavelength of the optical signal back through the first port 28 to the circulator 22, which directs this reflected wavelength to a "drop" port 32 of the circulator 22. The portion of the WDM optical signal, which is not reflected at 30, is passed through the selectable fiber Bragg grating 24 to a second port 34.

FIG. 2 shows a ROADM module, generally indicated by 40. A second circulator 36 is added to the building block of FIG. 1 to provide optical add capability. This configuration allows the selectable fiber Bragg grating 24 to be reused to add an optical signal having the selected wavelength. In operation, the configuration of FIG. 2 behaves similarly to that of FIG. 1. The WDM optical signal minus the dropped portion continues from the second port 34 to the second circulator 36 to output port 38. An optical "add" signal having the same wavelength as the selected wavelength is presented at "add" port 42 of the second circulator 36 which directs it to the second port 34 of the selectable fiber Bragg grating 24. The "add" signal is reflected by the selectable fiber Bragg grating 24 at 30. The "add" signal passes back through the second port 34 and through the second circulator 36 to the output port 38. The configuration of FIG. 2 thus provides increased functionality to that of FIG. 1 with only a small incremental increase in cost. It also has the advantage of little additional increase in insertion loss on the through path from input port 26 to output port 38.

Two-fiber optical ring networks typically use fiber pairs to communicate between nodes, one fiber for transmitting and one for receiving. FIG. 3 illustrates two of the ROADM blocks of FIG. 2, shown as 40A and 40B, used to form a bi-directional ROADM node, generally indicated by 43. ROADM block 40A receives WDM signals at 26A from a "West" facing node, drops and adds signals of a desired wavelength at 32A and 42A respectively and sends the WDM signal at 38A to an "East" facing node. Likewise, ROADM block 40B receives WDM signals at 26B from the "East" facing node, drops and adds signals of a desired wavelength at 32B and 42B respectively and sends the WDM signal at 38B to the "West" facing node.

Standard two-fiber (2F) SONET bi-directional line switched rings (BLSRs) require that a failure of node equipment can be handled by normal protection switching. A disadvantage of the configuration of FIG. 3 is that a failure of any of the components of a ROADM block takes the associated fiber path out of service and thus results in a traffic outage. For example, if there is a failure of the fiber Bragg grating 24A or 24B, the optical drop capability ceases to function because the selected wavelength will not be reflected correctly to circulator 22A or 22B. Similarly, the optical add capability stops as well because the optical signal to be added will not be reflected by the fiber Bragg grating 24A or 24B, back to the circulator 36A or 36B and out to the output port 38A or 38B, instead it will continue through the fiber Bragg grating 24A or 24B to the first circulator and will be directed to the "drop" port 32A or 32B. Worse still, performing maintenance on the node 43 by replacing components will result in a traffic outage.

FIG. 4 illustrates a bi-directional ROADM configuration having an "East/West" architectural split. The bi-directional ROADM node is split into a "West" module 44A and an "East" module 44B. Instead of the selectable fiber Bragg grating 24A of module 44A handling wavelength selection for both the "drop" port 32A and the "add" port 42A, the selectable fiber Bragg grating 24A in "West" module 44A handles only the wavelength selection of the "drop" port 32A. A second selectable fiber Bragg grating 24A' is added in "East" module 44B to select the wavelength to be added at the "add" port 42A. A failure in "West" module 44A would appear as a fiber failure, which can easily be handled by the SONET layer through normal protection switching and not affect the entire node. The failure would not affect the function of "add" port 42A in "East" module 44B. Similarly, selectable fiber Bragg grating 24B handles wavelength selection for only the "drop" port 32B and another selectable fiber Bragg grating 24B' handles the wavelength selection for the "add" port 42B.

A disadvantage of the configuration of FIG. 4 is that the cost savings advantage of reusing a selectable fiber Bragg grating to provide the wavelength selection for both drop and add functions of a ROADM, as described in relation to FIG. 2 and FIG. 3, is lost.

SUMMARY OF THE INVENTION

It is therefore an object of the present invention to overcome the aforementioned disadvantages in the prior art. Accordingly, devices and methods are provided for improved optical add/drop multiplexing.

One broad aspect of the invention provides an optical add/drop multiplexer having an optical wavelength selective device, a first optical circulator and a second optical circulator having a first operating mode and a second operating mode. The optical wavelength selective device has a first port and a second port and is adapted to reflect optical signals having a selected wavelength and to pass optical signals having wavelengths other than said selected wavelength. The first optical circulator has an input port and a drop port and is adapted to direct optical signals from the input port to the first port of the wavelength selective device and to direct optical signals from the first port of the wavelength selective device to the drop port. The second optical circulator has an output port and an add port. The second optical circulator, in the first operating mode, is adapted to direct optical signals from the second port of the wavelength selective device to the output port, and for directing optical signals from the add port to the second port of the wavelength selective device. In the second operating mode, the second optical circulator is adapted to direct optical signals from the add port to the output port.

In some embodiments, the optical wavelength selective device is adapted to select the selected wavelength from a plurality of wavelengths.

In some embodiments, the optical wavelength selective device is a selectable optical grating.

In some embodiments, the optical wavelength selective device is a selectable Bragg grating.

In some embodiments, the second optical circulator is a reversible optical circulator.

Another broad aspect of the invention provides a building block for a bi-directional optical add/drop multiplexer. The building block has an optical wavelength selective device, a first optical circulator and a second optical circulator having two operating modes. The optical wavelength selective device has a first port and a second port and is adapted to reflect optical signals having a selected wavelength and to pass optical signals having wavelengths other than the selected wavelength. The first optical circulator has an input port and a drop port and is adapted to direct optical signals from the input port to the first port of the wavelength selective device and to direct optical signals from the first port of the wavelength selective device to the drop port. The second optical circulator has an output port and an add port. The second optical circulator, in the first operating mode, is adapted to direct optical signals from an external wavelength selective device to the output port, and for directing optical signals from the add port to the external wavelength selective device. In the second operating mode, the second optical circulator is adapted to direct optical signals from the add port to the output port.

In preferred embodiments the building block is integrated on a single substrate.

In some embodiments the external wavelength selective device is a wavelength selective device of a corresponding building block.

Some embodiments of the invention provide an optical network node having at least two of the building blocks.

Some embodiments of the invention provide an optical network having an interconnected plurality of the optical network nodes.

Another broad aspect of the invention provides a method of wavelength management in an optical network. The method involves providing at least one network node with at least a first and a second building block for a bi-directional optical add/drop multiplexer. Each building block has an optical wavelength selective device, a first optical circulator and a second optical circulator having at least two operating modes. The optical wavelength selective device has a first port and a second port and is adapted to reflect optical signals having a selected wavelength and to pass optical signals having wavelengths other than the selected wavelength. The first optical circulator has an input port and a drop port and is adapted to direct optical signals from the input port to the first port of the wavelength selective device and to direct optical signals from the first port of the wavelength selective device to the drop port. The second optical circulator has an output port and an add port. The second optical circulator, in the first operating mode, is adapted to direct optical signals from the second port of the wavelength selective device of the other building block, to the output port, and for directing optical signals from the add port to the second port of the wavelength selective device of the other building block. In the second operating mode, the second optical circulator is adapted to direct optical signals from the add port to the output port.

The method further involves operating each second optical circulator in the first operating mode and when a failure is detected in one of the building blocks, operating the second circulator of the other building block in the second operating mode.

BRIEF DESCRIPTION OF THE DRAWINGS

Further features and advantages of the present invention will become apparent from the following detailed description, taken in combination with the appended drawings in which.

DETAILED DESCRIPTION OF THE PREFERRED EMBODIMENTS

Figure 5:
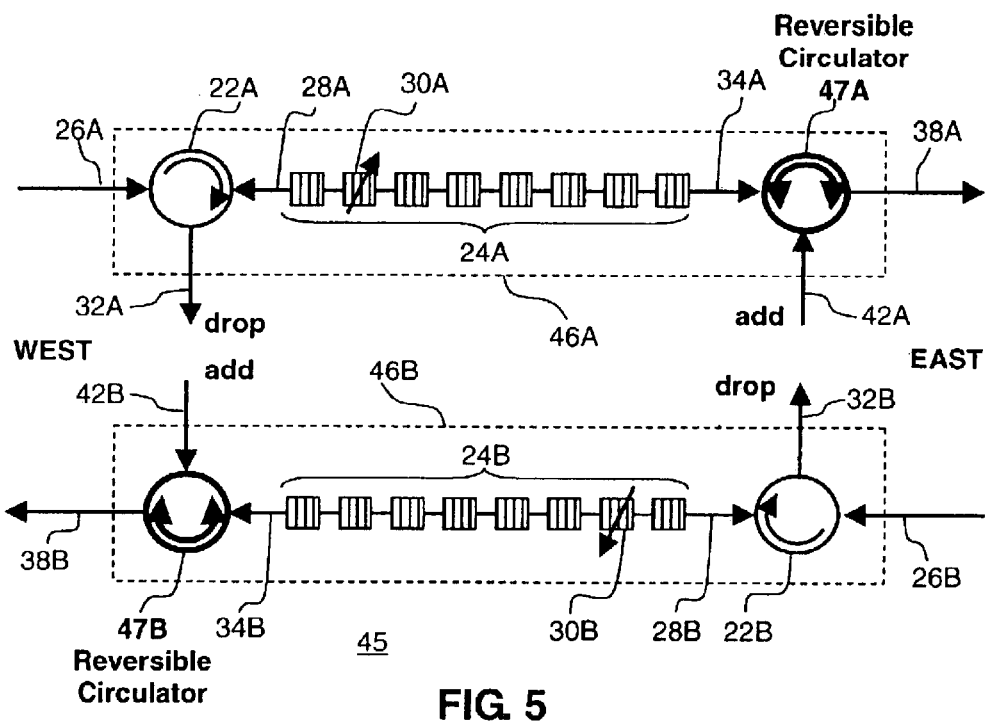
FIG. 5 is a block diagram of a bi-directional re-configurable optical add/drop multiplexer (ROADM) node using a reversible circulator in accordance with an embodiment of the invention.

Referring now to FIG. 5, shown is a block diagram of a bi-directional ROADM node 45 according to an embodiment of the present invention. The ROADM node 45, comprises two ROADM blocks 46A and 46B. The ROADM node 45 has a configuration similar to that of the bi-directional ROADM node 43 of FIG. 3, with the important difference that the second circulator 47A and 47B, of each ROADM block 46A and 46B is a reversible circulator.

Note that for ease of description, the following discussion will be restricted to only one half of FIG. 5, namely ROADM block 46A. Because the ROADM node 45 is symmetrical, the description applies equally to the other half of FIG. 5 and thus the reference numerals of corresponding elements of ROADM block 46B will be shown in parentheses. The reversible circulators 47A (47B) can operate in one of two modes, a forward mode or a reverse mode (a first mode or a second mode respectively). Typically, when there is no failure in the ROADM block 46A (46B), the reversible circulator 47A (47B) is operated in the forward mode (first mode), in which case the ROADM block 44A (44B) behaves identically to the ROADM block 40A (40B) of the ROADM node 43 of FIG. 3 as described above. The ROADM block 46A (46B) benefits from the costs savings of reusing the selectable fiber Bragg grating 24A (24B) to select both the wavelength to drop at 32A (32B) and to select the wavelength to add at 42A (42B). Another important benefit is reduced optical path losses through the ROADM block 46A (46B), that is, between input port 26A (26B) and output port 38A (38B).

Figure 1:
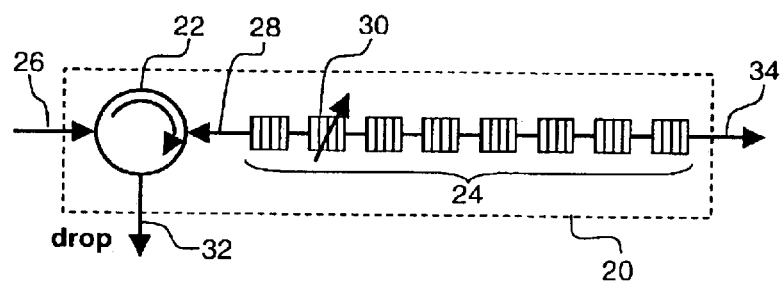
FIG. 1 is a block diagram of a conventional re-configurable optical add/drop multiplexer (ROADM) building block.
Figure 2:
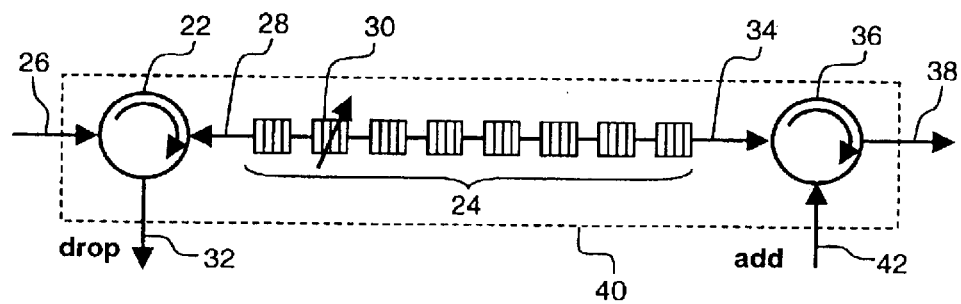
FIG. 2 is a block diagram of a conventional re-configurable optical add/drop multiplexer (ROADM) module.
Figure 3:
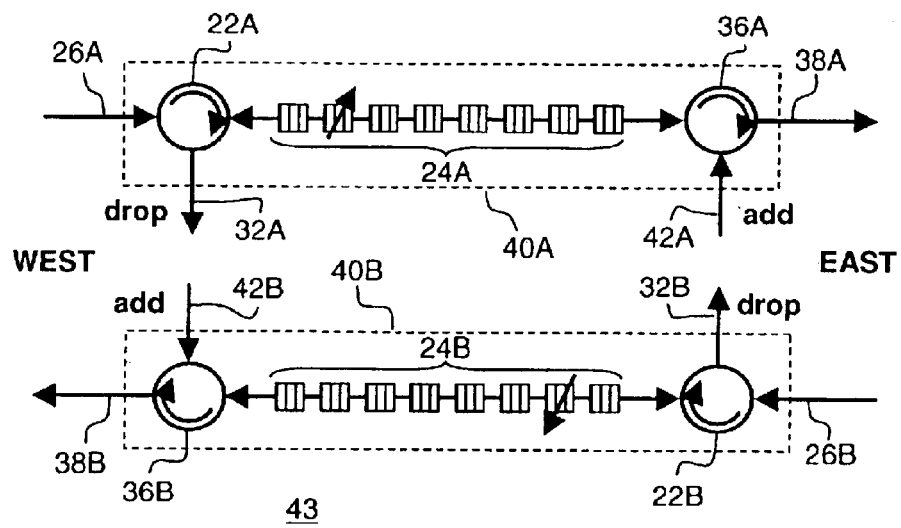
FIG. 3 is a block diagram of a conventional bi-directional re-configurable optical add/drop multiplexer (ROADM) node.
Figure 4:
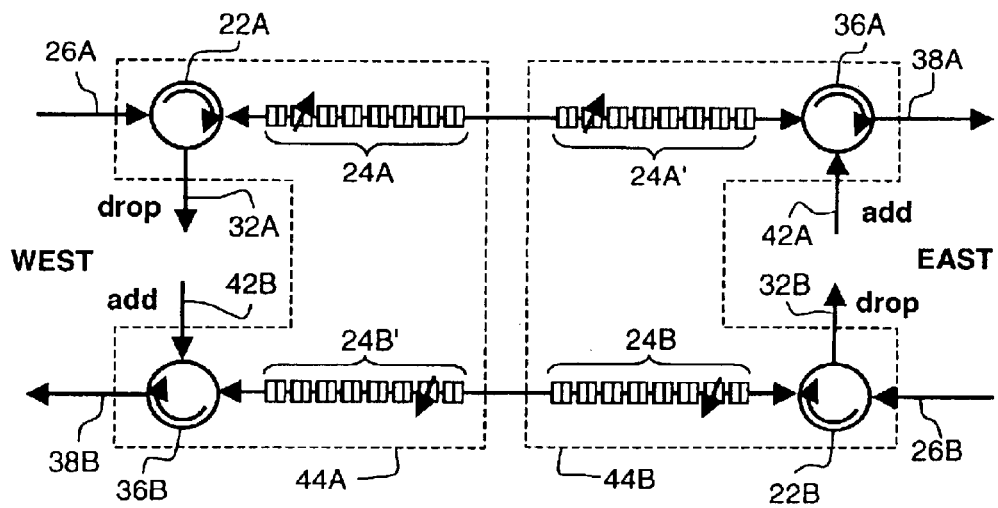
FIG. 4 is a block diagram of a conventional bi-directional re-configurable optical add/drop multiplexer (ROADM) node having an "East/West" architectural split.

The important difference between the embodiment of the present invention and the prior art as shown in FIG. 3, becomes apparent if there is a failure in the ROADM block 46A (46B), in which case the reversible circulator 47A (47B) is operated in the reverse mode (second mode) so that all optical signals appearing at the "add" port 42A (42B) are directed to the output port 38A (38B). ROADM block 46A (46B) thus becomes a broadband add device.

In one embodiment of the present invention the elements of the ROADM node 46A (46B) of FIG. 5 such as circulator 22A (22B), selectable fiber Bragg grating 24A (24B), and reversible circulator 47A (47B), are discrete devices.

Any suitable optical wavelength selective device can be substituted in place of the selectable fiber Bragg grating 24A (24B) described above.

Figure 6:
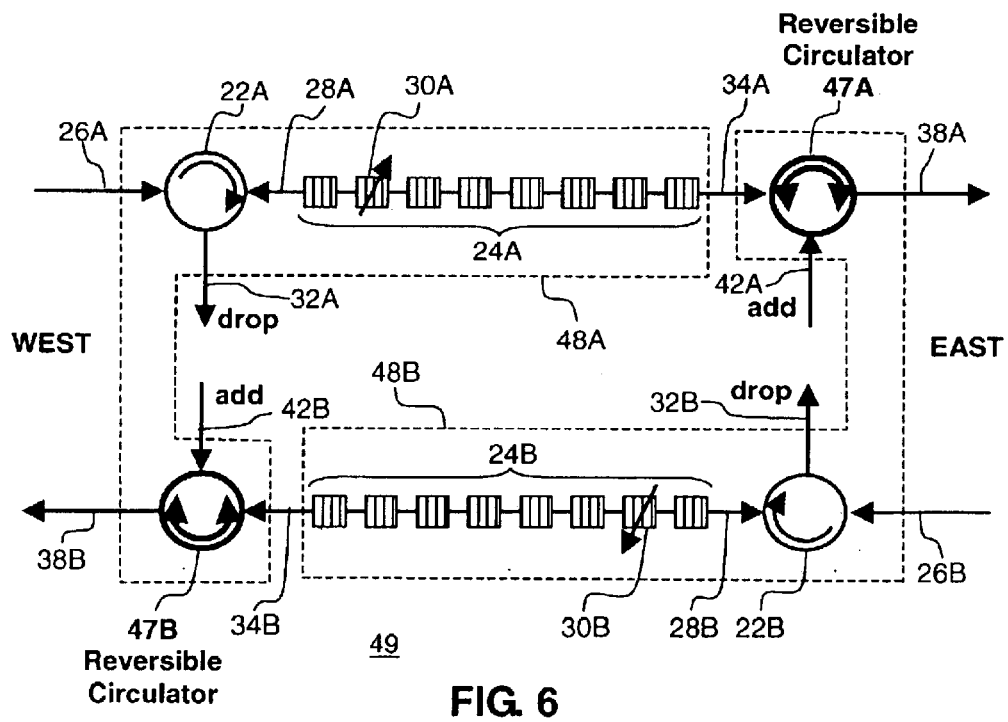
FIG. 6 is a block diagram of a bi-directional re-configurable optical add/drop multiplexer (ROADM) node using a reversible circulator and having an "East/West" architectural split in accordance with an embodiment of the invention.

FIG. 6 illustrates a preferred embodiment of the present invention. Shown is ROADM node 49 whose elements are identical to those of ROADM node 45 of FIG. 5 and they operate in the same manner but here they are grouped into a "West" module 48A and an "East" module 48B. Thus, "West" module 48A comprises circulator 22A, selectable fiber Bragg grating 24A and reversible circulator 47B. Circulator 22A has input port 26A, a "drop" port 32A and port 28 which is connected to selectable fiber Bragg grating 24A. Selectable fiber Bragg grating 24A has output port 34A which is intended to connect to reversible circulator 47A of "East" module 48B. Reversible circulator 47B is physically part of "West" module 48A but has no optical connection to other elements of "West" module 48A. Reversible circulator 47B is intended to connect to selectable fiber Bragg grating 24B of "East" module 48B. Similarly, "East" module 48B comprises circulator 22B, selectable fiber Bragg grating 24B and reversible circulator 47A. The identical modules "West" 48A and "East" 48B are intended to interconnect to create a ROADM node 49. ROADM node 49 thus has an "East"/"West" architectural split. In the case of a failure in one of the modules "West" 48A ("East" 48B), the other module "East" 48B ("West" 48A) can operate its reversible circulator 47A (47B) in reverse mode thus becoming a broadband add device. Removal of "West" Module 48A ("East" module 48B) can then appear as a simple fiber failure to underlying equipment such as a SONET add/drop multiplexer (ADM). Such a fiber failure can be handled through normal protection switching and thus, "West" Module 48A ("East" module 48B) can be removed and replaced without causing a traffic outage except for a brief forced protection switch.

Another embodiment of the present invention provides a method of wavelength management in an optical network using the ROADM block 46A (46B) of the present invention as described with reference to FIG. 6. However, the method is not limited to using ROADM block 46A (46B).

Figure 7:
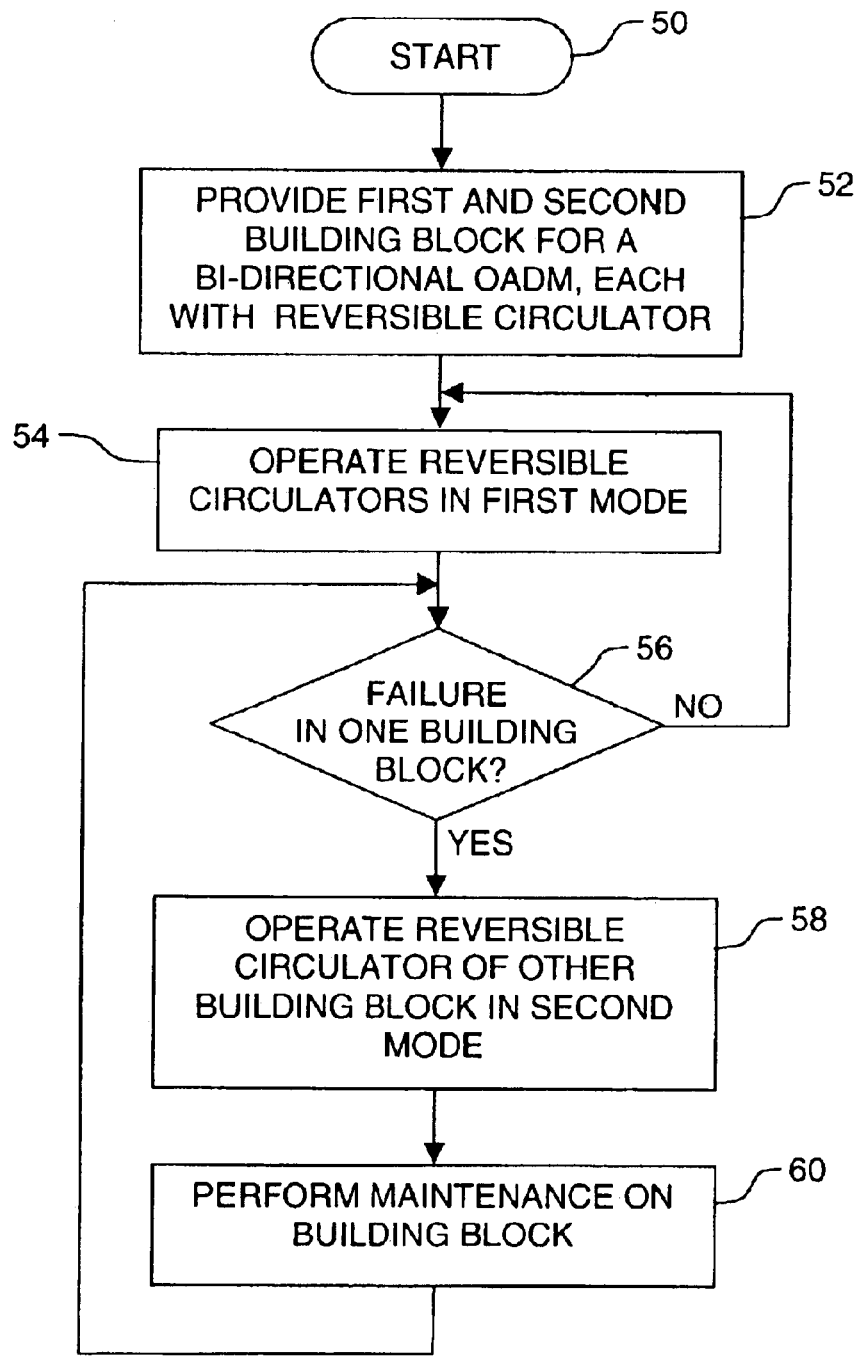
FIG. 7 is a flowchart of a method of wavelength management in accordance with an embodiment of the invention.

Referring now to FIG. 7, a flowchart of the method is illustrated. The method involves providing at least one network node with at least a first and a second building block for a bi-directional optical add/drop multiplexer (step 52). Each building block has an optical wavelength selective device, a first optical circulator and a second optical circulator having at least two operating modes. The optical wavelength selective device is adapted to reflect optical signals having a selected wavelength and to pass optical signals having wavelengths other than the selected wavelength. In one embodiment, the wavelength selective device is a selective fiber Bragg grating. The first optical circulator is adapted to direct optical signals from an input port to a first port of the wavelength selective device and to direct optical signals from the first port of the wavelength selective device to a "drop" port. The second optical circulator can be a reversible circulator, and in a first operating mode (forward mode), is adapted to direct optical signals from a second port of the wavelength selective device of the other building block, to an output port, and for directing optical signals from an "add" port to the second port of the wavelength selective device of the other building block. In a second operating mode (reverse mode), the second optical circulator is adapted to direct optical signals from the "add" port to the output port.

Each second optical (reversible) circulator is operated in a first (forward) mode such that OADM service is provided (step 54). If a failure is detected in one building block (step 56), the other building block operates its second optical (reversible) circulator in a second (reverse) mode (step 58) so as to direct optical signals from the add port to the output port. Optionally but preferably, maintenance is then performed on the building block having the failure (step 60). Maintenance can involve removal and replacement of the defective building block. The method then returns to step 56 where failures are detected. If no failure is detected, the reversible circulators are operated in the first (forward) mode.

Numerous modifications and variations of the present invention are possible in light of the above teachings. It is therefore to be understood that within the scope of the appended claims, the invention may be practised otherwise than as specifically described herein.

We claim:

1. An optical add/drop multiplexer comprising:
   an optical wavelength selective device adapted to reflect optical signals having a selected wavelength and to pass optical signals having wavelengths other than said selected wavelength, the wavelength selective device having a first port and a second port;
   a first optical circulator having an input port and a drop port, the first optical circulator adapted to direct optical signals from said input port to said first port of said wavelength selective device and to direct optical signals from said first port of said wavelength selective device to said drop port;
   a second optical circulator having an output port and an add port and having a first operating mode and a second operating mode, the second optical circulator, in said first operating mode, adapted to direct optical signals from said second port of said wavelength selective device to said output port, and for directing optical signals from said add port to said second port of said wavelength selective device and in said second operating mode, adapted to direct optical signals from said add port to said output port.

2. An optical add/drop multiplexer as claimed in claim 1, wherein said optical wavelength selective device is adapted to select the selected wavelength from a plurality of wavelengths.

3. An optical add/drop multiplexer as claimed in claim 2, wherein said optical wavelength selective device is a selectable optical grating.

4. An optical add/drop multiplexer as claimed in claim 3, wherein said optical wavelength selective device is a selectable Bragg grating.

5. An optical add/drop multiplexer as claimed in claim 1, wherein said second optical circulator is a reversible optical circulator.

6. A building block for a bi-directional optical add/drop multiplexer, the building block comprising:
- an optical wavelength selective device adapted to reflect optical signals having a selected wavelength and to pass optical signals having wavelengths other than said selected wavelength, the wavelength selective device having a first port and a second port;
- a first optical circulator having an input port and a drop port, the first optical circulator adapted to direct optical signals from said input port to said first port of said wavelength selective device and to direct optical signals from said first port of said wavelength selective device to said drop port;
- a second optical circulator having an output port and an add port and having a first operating mode and a second operating mode, the second optical circulator, in said first operating mode, adapted to direct optical signals from an external wavelength selective device to said output port, and for directing optical signals from said add port to said external wavelength selective device and, in said second operating mode, adapted to direct optical signals from said add port to said output port.

7. A building block for a bi-directional optical add/drop multiplexer as claimed in claim 6, wherein the building block is integrated on a single substrate.

8. A building block for a bi-directional optical add/drop multiplexer as claimed in claim 7, wherein said optical wavelength selective device is adapted to select the selected wavelength from a plurality of wavelengths.

9. A building block for a bi-directional optical add/drop multiplexer as claimed in claim 8, wherein said optical wavelength selective device is a selectable optical grating.

10. A building block for a bi-directional optical add/drop multiplexer as claimed in claim 9, wherein said optical wavelength selective device is a selectable Bragg grating.

11. A building block for a bi-directional optical add/drop multiplexer as claimed in claim 10, wherein said second optical circulator is a reversible optical circulator.

12. A building block for a bi-directional optical add/drop multiplexer as claimed in claim 6, wherein said external wavelength selective device is a wavelength selective device of a corresponding building block.

13. An optical network node comprising at least two building blocks according to claim 6.

14. An optical network comprising an interconnected plurality of optical network nodes according to claim 13.

15. A method of wavelength management in an optical network comprising the steps of:
- providing at least one network node with at least a first and a second building block for a bi-directional optical add/drop multiplexer, each building block comprising an optical wavelength selective device adapted to reflect optical signals having a selected wavelength and to pass optical signals having wavelengths other than said selected wavelength, the wavelength selective device having a first port and a second port, a first optical circulator having an input port and a drop port, the first optical circulator adapted to direct optical signals from said input port to said first port of said wavelength selective device and to direct optical signals from said first port of said wavelength selective device to said drop port, a second optical circulator having an output port and an add port and having a first operating mode and a second operating mode, the second optical circulator, in said first operating mode, adapted to direct optical signals from said second port of the wavelength selective device of the other of said first and second building block, to said output port, and for directing optical signals from said add port to said second port of the wavelength selective device of the other of said first and second building block and, in said second operating mode, adapted to direct optical signals from said add port to said output port;
- operating each second optical circulator in said first operating mode;
- when a failure is detected in one of the first and second building blocks, operating said second circulator of the other of said first and second building blocks in said second operating mode.

* * * * *